June 12, 1956 N. H. BATES 2,750,570
LOCKING ELECTRIC PLUG
Filed March 31, 1954
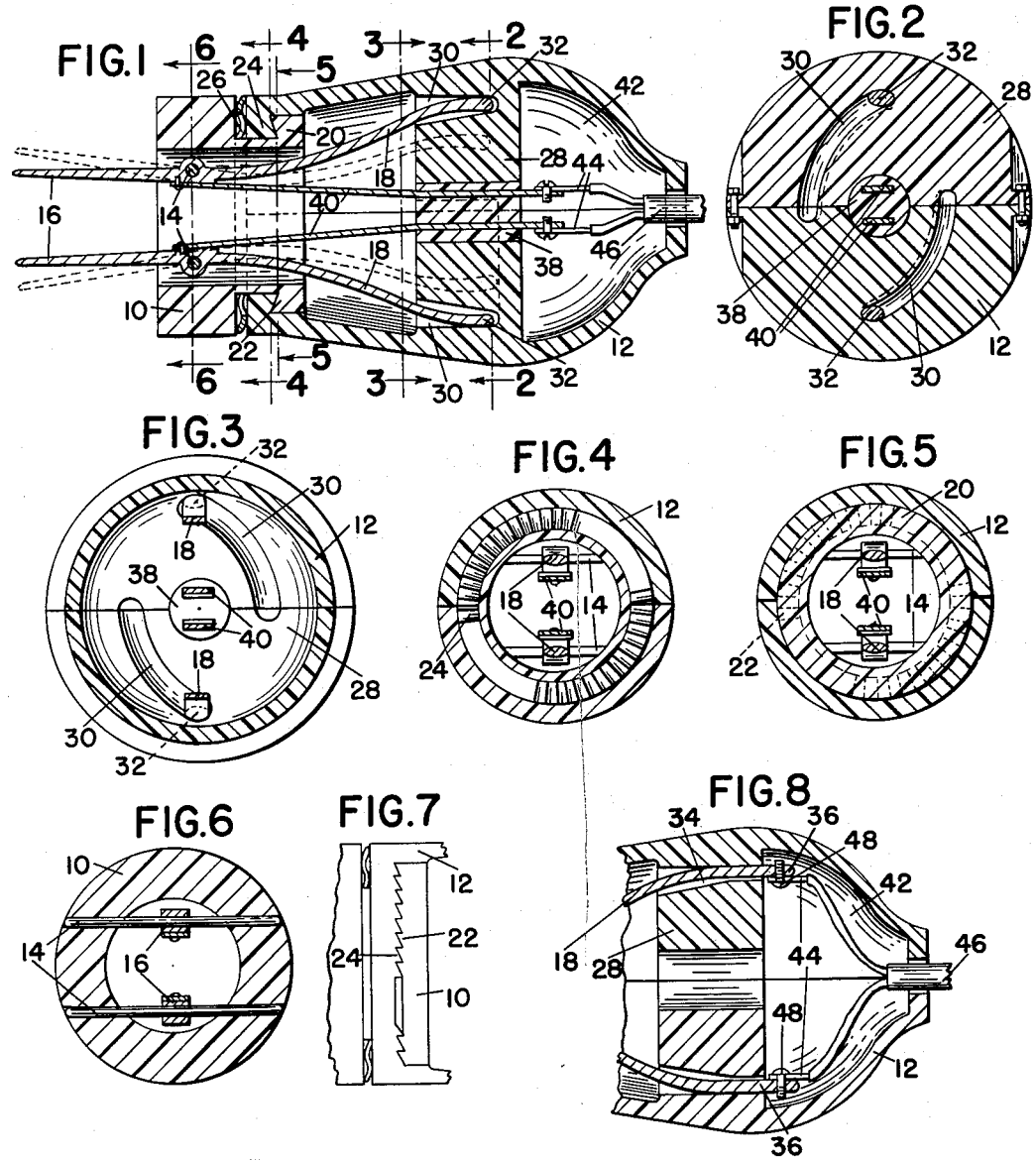
INVENTOR
NORMAN H. BATES
*Charles R. Fay*
ATTORNEY

2,750,570

LOCKING ELECTRIC PLUG

Norman H. Bates, Norwich, Conn.

Application March 31, 1954, Serial No. 420,040

3 Claims. (Cl. 339—74)

This invention relates to a new and improved locking electric plug particularly of the male type, and the principal object of the invention provides a plug for domestic or industrial use which is insertable into the usual electric outlet and by means of a very simple manual manipulation, the same is locked thereto so that it cannot accidentally escape therefrom.

Other objects of the invention include the provision of an electric plug comprising two parts, one of which carries extending prongs for insertion into the usual outlet, together with contact means for attachment for instance to a wire or the like and the other part being associated therewith and comprising a housing having means for moving the prongs relatively to each other in order to lock the same in frictional relation to the prongs of the usual electric outlet; the provision of a device as above stated wherein one part of the plug is rotationally mounted on the other part and comprises means for latching the same in adjusted rotational position, including cam means for moving the prongs as above stated as the device is rotated with relation to the part carrying the prongs; and the provision of a device as recited including a second part which is rectilinearly or axially movable in order to move the prongs to clamp the same as above described, and including release mechanism providing for backing off the second part to release the plug from the outlet.

Other objects and advantages of the invention will appear hereinafter.

Reference is to be had to the accompanying drawings, in which:

Fig. 1 is a vertical section through a plug according to the invention;

Figs. 2, 3, 4, 5 and 6 are sectional views, taken respectively on the corresponding lines in Fig. 1;

Fig. 7 is a diagrammatic view illustrating the locking teeth which may be used between the movable members; and Fig. 8 is a section through a modification.

In carrying out the present invention, there are provided two main parts generally indicated at 10 and 12 in Fig. 1. The part 10 is preferably circular in shape and is provided with a pair of fixed pins 14 which pivotally mount a pair of electricity-conducting prongs 16 for motion between the parallel solid line position of Fig. 1 and the spread-apart dotted line position thereof.

The member 10 is centrally apertured to provide a mounting area internally thereof for the prongs 16 and for rearward extensions 18 which may be bent or formed in the manner shown for a purpose to be described. The member 10 has a reduced neck extending to the right in Fig. 1, terminating in an enlarged flange 20 which provides a shoulder at 22, the shoulder being toothed as shown and cooperating with complementary teeth on an inturned flange 24 on the member 12 at one end thereof.

The member 12 is preferably made in two parts as shown in Fig. 2, so that the same may be assembled with relation to the circular body 10 or at least with respect to the flange 20 thereof. A spring washer 26 is interposed between a lateral surface of the member 10 and the forward surface of the member 12 as clearly shown in Fig. 1, thus resiliently and yieldably maintaining the teeth in engaged condition but allowing for separation of the teeth and relative rotation of the parts by pushing member 12 to the left against the action of the spring washer 26.

The member 12 is provided with a centrally located internal, generally circular partition 28 provided with a pair of cam members 30 each of which is supplementary to the other, see Fig. 2, and receives the ends 32 of the rearward extensions 18 of the prongs 16.

In Fig. 1, the cam members 30 are shown as grooves or recesses but these may take the form of slots as shown at 34 in Fig. 8, in which case the extended ends 32 will pass through these slots as at 36 and appear at the rear side of the partition 28 rather than being contained wholly therewithin as in Fig. 1.

The partition 28 is centrally cylindrically apertured and rotationally receives therein a plug or the like 38 forming a lateral support for a pair of elongated flexible electric contact members 40 separately secured to the prongs 16 and extending rearwardly into the chamber 42, see Fig. 1, to be secured to the ends 44 of the wire 46 and leading to the appliance to be energized.

In the Fig. 8 modification, the end 36 of the extensions 18 may be directly secured as at 48 to the leads of the cable 46 and in this case of course the flexible contact members 40 are not necessary.

In the operation of this device, the same is grasped in the hand as usual and the prongs being held in more or less parallel relationship as shown in Fig. 1, the same is applied to the usual electric outlet. The prongs 16 are now in contact with the conventional resilient contact strips found in these outlets and upon a rotational motion of the member 12 relative to the now non-rotationally held member 10, the cams 30 will cause the extensions 18 of the prongs 16 to approach each other, i. e., they move toward the center of the device, and clearly this moves the prongs 16 outwardly away from each other to hold tightly and grip the electric outlet prongs, frictionally locking the device in position. The teeth at 22 are arranged so as to allow one-way rotation only and these teeth will hold member 12 in any rotational position in which it is desired to locate the same, depending upon the amount of pressure wanted or depending upon the limits of motion available to the prongs 16. When it is desired to release the plug, the member 12 is moved toward the left in Fig. 1 against the action of spring 26, thus disengaging teeth 22 but allowing member 12 to be rotated in the opposite direction, swinging back extensions 18 of prongs 16 to their inward parallel locations shown in solid lines in Fig. 1.

It will be seen that this invention provides a relatively simple and fool-proof self-locking electric plug which is very easily operated both to attach it and to disengage it as desired. Light manual pressure only is needed to lock the device in place against accidental displacement thereof, even when using automatic reels for reeling up the electric cord. These plugs will not accidentally become detached and as a matter of fact it is almost impossible to force them out of their locking position in conjunction with the usual outlets without manually releasing the same as described above in order to easily release the prongs from the complementary prongs in the electric outlets.

Having thus described my invention and the advantages thereof, I do not wish to be limited to the details herein disclosed, otherwise than as set forth in the claims, but what I claim is:

1. An electric plug comprising a housing, a pair of prongs swingably mounted thereon intermediate the ends of the prongs, extending ends on the prongs, a rotatable actuating member associated with the housing, a partition therein, a pair of cam surfaces in the partition extending on lines gradually diverging from the axis of the actuator, the extending ends of the prongs being located on the cam surfaces for motion therewith as the actuator is turned relative to the housing.

2. An electric plug comprising a housing, a pair of prongs swingably mounted thereon intermediate the ends of the prongs, extending ends on the prongs, a rotatable actuating member associated with the housing, a partition therein, a pair of cam surfaces in the partition extending on lines gradually diverging from the axis of the actuator, the extending ends of the prongs being located on the cam surfaces for motion therewith as the actuator is turned relative to the housing, spring contacts secured to the prongs and extending centrally through the partition, and a cable electrically connected to the spring contacts.

3. An electric plug comprising a housing, a pair of prongs swingably mounted thereon intermediate the ends of the prongs, extending ends on the prongs, a rotatable actuating member associated with the housing, a partition therein, a pair of cam surfaces in the partition extending on lines gradually diverging from the axis of the actuator, the extending ends of the prongs being located on the cam surfaces for motion therewith as the actuator is turned relative to the housing, said cam surfaces being slots in the partition and the extending ends of the prongs extending through the slots, and an electric cable secured to the extending ends of the prongs.

References Cited in the file of this patent

UNITED STATES PATENTS

| | | |
|---|---|---|
| 2,046,221 | Thomas | June 30, 1936 |
| 2,274,798 | Kostal | Mar. 3, 1942 |
| 2,383,109 | Conlan | Aug. 21, 1945 |
| 2,476,510 | Rosner | July 19, 1949 |

FOREIGN PATENTS

| | | |
|---|---|---|
| 463,842 | Great Britain | Apr. 7, 1937 |